(12) United States Patent
Adamo et al.

(10) Patent No.: US 8,077,245 B2
(45) Date of Patent: Dec. 13, 2011

(54) APPARATUS FOR IMAGING USING AN ARRAY OF LENSES

(76) Inventors: Thomas J. Adamo, New York, NY (US); Lars Montelius, Bjerred (SE)

( * ) Notice: Subject to any disclaimer, the term of this patent is extended or adjusted under 35 U.S.C. 154(b) by 1293 days.

(21) Appl. No.: 10/591,215

(22) PCT Filed: Mar. 16, 2005

(86) PCT No.: PCT/US2005/008727
§ 371 (c)(1),
(2), (4) Date: Aug. 30, 2006

(87) PCT Pub. No.: WO2005/089369
PCT Pub. Date: Sep. 29, 2005

(65) Prior Publication Data
US 2007/0182821 A1    Aug. 9, 2007

(30) Foreign Application Priority Data

Mar. 17, 2004    (SE) ........................................ 0400674

(51) Int. Cl.
*H04N 5/335*    (2006.01)
*H04N 5/225*    (2006.01)
(52) U.S. Cl. ........................................ 348/340; 348/294
(58) Field of Classification Search .................. 348/340, 348/324, 294; 356/419
See application file for complete search history.

(56) References Cited

U.S. PATENT DOCUMENTS

| | | | | |
|---|---|---|---|---|
| 5,973,844 A * | 10/1999 | Burger | | 359/622 |
| 6,373,995 B1 * | 4/2002 | Moore | | 382/284 |
| 7,138,663 B2 * | 11/2006 | Hoshuyama | | 257/98 |
| 7,667,283 B1 * | 2/2010 | Smith et al. | | 257/432 |
| 2007/0091197 A1 * | 4/2007 | Okayama et al. | | 348/340 |

* cited by examiner

*Primary Examiner* — Tuan Ho
*Assistant Examiner* — Selam Gebriel
(74) *Attorney, Agent, or Firm* — Levisohn, Berger, LLP

(57) ABSTRACT

An imaging system/camera consisting of multiple nano-sized optical elements arranged in an array format with more than one pixel per optical element will have a higher resolution than each element would be capable of individually, since each element being at a different point gathers slightly different overlapping information. Hence by processing such information one can obtain a clear image. Furthermore multiple information from sectors of an array of sensors can be processed to obtain 3-D, stereotypic and panoramic imaging and may be connected to each other allowing seeing around obstacles as well as enabling full 3-D tracking and/or metric determination of an unknown object. Color/spectroscopic imaging can be achieved by utilizing equally sized lenses and multi-wavelength sensing layers below the lenses. However, color/spectroscopic imaging and/or spectroscopy can be achieved by taking advantage of unique optical properties of nano-scaled lenses accepting various wavelengths below their diffraction limits.

23 Claims, 4 Drawing Sheets

APPARATUS FOR IMAGING USING AN ARRAY OF LENSES

BACKGROUND OF INVENTION

1. Field of Invention

The invention relates mainly to digital imaging and photographic camera technology for detection of electromagnetic radiation.

2. Other areas

Other potential areas can be systems for digital photography and imaging, medical, research, industrial, civil and military surveillance, monitoring and automatic sensor function. The electromagnetic radiation to be detected can be of all kinds including but not limited to ordinary visible light, UV-light, IR-light and THz-radiation.

Examples of applications for this technology:
Motion Detectors with Imaging Capability
Biological, Medical and Surgical Imaging
Cell and Sub-cellular Imaging
Implanted Devices
Micron and Nanosized Vehicles for guidance and reconnaissance
Imaging from Aircraft, Space Vehicles or Rovers, particularly small robotically controlled vehicles, such as Micro or Nano
Unmanned Aerial Vehicle (MUAV, NUAV)
Ultralight large arrays for Space and Astronomical Imaging.

3. Description of Related Art

Previously Employed Technique/Technology
(Construction and Function)

In today's digital cameras one (or more) lenses are always used to focus and to define the image onto the focal plane where the light sensitive device (i.e. usually a CCD-plate) is situated. On top of the light sensitive device sometimes a micro lens is placed in order to harvest as much light as possible to the individual light sensitive components.

Problems with Employed Technology

There is an ongoing trend to make cameras and imaging systems smaller and smaller in order to increase application area. In today's digital cameras one (or more) millimeter or larger lenses are always used to focus and to define the image onto the focal plane where the light sensitive device (i.e. usually a CCD-plate) is situated. On top of the light sensitive device sometimes a micro lens is placed in order to harvest as much light as possible to the individual light sensitive components. This construction necessitate the use of a relatively large lens system which in turn means that the cost for such an apparatus is high as well as the actual size of the apparatus will be dictated by the lens system employed. This makes it impossible to shrink optical cameras to dimensions that will be compatible with nanodevice applications such as guiding micron sized autonomous systems for microsurgery, surveillance, reconnaissance and other future converging technologies.

Imaging devices are inherently more complex than sensors and thus present unique problems as compared to nano or micron-sized,transducers that sense various forms of energy including simple light detectors.

Ordinary cameras as outlined above use a single large lens or recently one lens per pixel, as a condenser in order to increase imaging sensitivity, which means it acts as a light sensor incapable of producing images. If one would have one lens for many pixel elements when trying to make such imaging systems smaller, one would be hindered from obtaining good imaging capability due to diffraction limits. Thus physical laws limit the usefulness e.g. in millimeter sized imaging devices having rather low resolution. If one further reduces a conventional camera design to extremely small proportions i.e. nano-size, far field light waves will be blocked at wavelengths larger than the physical size of the aperture.

SUMMARY OF THE INVENTION

The inventive imaging apparatus consists of multiple optical elements of sub-micron, nanometer scale supported onto a partly or fully radiation transmitting layer, which in turn is situated on top of a radiation sensitive layer being patterned so that under each optical element there exists at least more than one radiation harvesting element that may be individually affected by radiation. The material of the individual optical elements has a property that causes them to function as lenses. A partly or fully radiation transmitting layer may consist of homogenous material or heterogeneous material, e.g. a layer consisting of fiber, spacer or a fluid or combinations thereof, being malleable by changing its volume, spacing, curvature, other shape change, or chemistry. The functions of focusing, light filtering, optical correction or zooming can be achieved by fluidic, capillary force, molecular rearrangement or chemistry, as well as nano-sized levers or fibers to adjust size or refractive property of the optical system. The optical elements may also be composed of different layers of refractive material enabling radiation of different wavelengths to be manipulated during the path through the optical element to compensate for chromatic aberration effects etc. in accordance with the art of such radiation control by proper choice of lens material. The material and malleability of the individual optical elements and system have a property or properties that cause them to be capable of focusing, zooming, light filtering and optical aberration correction.

Preferably, in the inventive imaging apparatus, the radiation harvesting elements will work as a photoelectric device that will produce an electronic signal. Such an electronic signal produced may preferably be monitored and/or manipulated by electronic digital processing making an electronic read-out possible. By image enhancing processing algorithms, overlapping information as described above from physically (geometrically) or electronically defined arrays of sensors or "sectors" one can obtain a high resolution image. Since each of the individual lenses or groups of lenses will have a slightly different spatial viewpoint, the multiple information from electronically or geometrically defined multiple sectors of the array of sensors e.g. left and right sector, can be processed to obtain 3-D or stereotypic images.

The invention also includes a digital camera comprising the imaging apparatus described above in combination with a shutter layer or layers which can be made with dimensions barely visible to ordinary vision or incorporated into either large, micro-sized or nano-sized devices e.g. credit card, button, pin, medical device, etc.

All functional elements of the imaging apparatus and/or camera as described above can be made out of various kind of materials and in one implementation be made out of flexible material. The optical elements may be arranged cylindrically as on a flexible tape, or spherically to obtain wide angle views. It can also be used for wide angle view detection by curving the sensor array in a 2-dimensional fashion combined with stitching the information together thereby producing up to 360 degree panoramic imaging.

The inventive imaging apparatus can also be used for wide angle view detection by spherizing the sensor array in a 3-dimensional fashion combined with stitching the information together thereby producing a full 360 degree "fish-eye" imaging capability in all 3-dimensions. Image processing can produce projections known photographically as "fisheye" i.e. circular, rectilinear, or other flat map projections.

In one embodiment, color imaging and spectroscopic imaging can be obtained by utilizing equal sized lenses and using multi-wavelength sensing layers below the lenses.

The imaging apparatus and/or camera as described above can be employed for spectroscopic imaging and/or spectroscopy taking advantage of the optical properties of nano-scaled lenses by controlling the diameter of the lenses at a nanometer level thereby accepting various wavelengths below the diffraction limit as illustrated in, but not limited by, the two following examples:

A) In one configuration stepwise sized lenses with gradually increasing/decreasing diameter could be employed by utilizing processing to remove the cumulative component of the incrementally larger lenses, e.g. having the smallest diameter lens being capable of admitting only the UV-light waves and the largest diameter lens admitting all wavelengths up to IR-radiation.

B) In another configuration color imaging can be achieved by controlling the diameter of a limited set of 2, 3 or more lenses at a nanometer level. Lenses with different diameters could be utilized to detect discrete wavelengths which subsequently are additively combined to produce a color-code necessary for standard (e.g. RGB, CMYK) or false color processing.

The electronic read-out signal as described above may be electronically processed in many different ways, by delivery to further imbedded processing and storage circuitry, or to deliver information to a separate or remote device, which in itself stores information for that can be observed, stored and/or redelivered/re-broadcast.

In one embodiment multiple cameras may be distributed in space and connected to each other and or a central processor by wire or wirelessly enabling retrieval of multiple information. This information can be assembled interferometrically such as a large radio telescope array or to create multiple viewpoints seeing around obstacles. It can also be employed as a tracking device enabling full 3-dimensional capability as well as a "measurement station" making true 3-dimensional metric determination of an unknown object.

DETAILED DESCRIPTION OF THE INVENTION

An extraordinarily small imaging system/camera characterized by having a high resolution through nanofabrication and image processing in which the fabrication of layered elements can be applied to a flat or flexible base such as tape.

Figure 1:
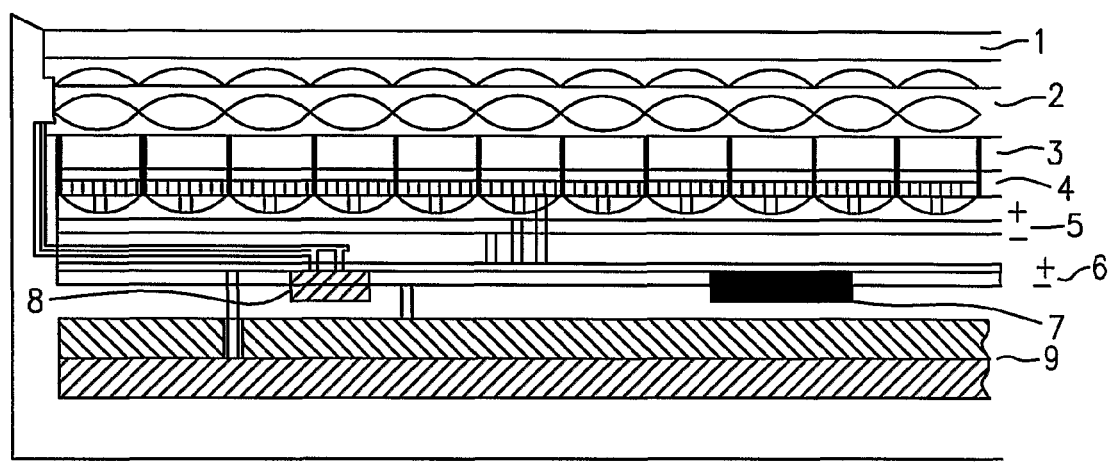
FIG. 1 is a schematic of the basic embodiment of the camera showing a magnified cross section. Explanation of the different layers are as follows:
1. Protective (and/or variable density filtering) cladding
2. Lens array system, here shown a triplet optical design
3. Partly or fully transmissive spacing and/or focusing layer shown with light baffles.
4. Sensor array
5. Connecting circuit layer
6. Image assembling layer for the images
7. Processing layer
8. Control processor for light transmission and focusing
9. Power circuit or battery
(Note: Layer 1, 5-9 are just given as examples of a possible configuration whereas layers 2-4 illustrate the essential elements described in the patent).

Nano/macrosized optical elements 12 arranged in an array format 2 with more than one pixel per nano-sized optical element will become an imaging device itself rather than a light sensor (see FIG. 1).

Since an array is used, each element being at a different point gathers slightly different overlapping information, processing such information by interpolation, and/or interferometrically, one can obtain an image with much higher resolution than each of these multiple elements would be capable of individually and without a larger aperture and focal length single lens. Under most conditions focusing will be unnecessary due to extreme depth of field but may be controlled as outlined below or by the program algorithms used.

Since each of the lens/pixel groups will have a slightly different spatial viewpoint, the multiple information from electronically or geometrically defined multiple sectors of the array of sensors e.g. left and right sector, can be processed to obtain 3-D or stereotypic images.

By curving the sensor array in a 2-dimensional fashion e.g. on flexible tape, combined with stitching the information together a wide angle view detection can be achieved where up to 360 degree panoramic imaging capability can be achieved.

Figure 2:
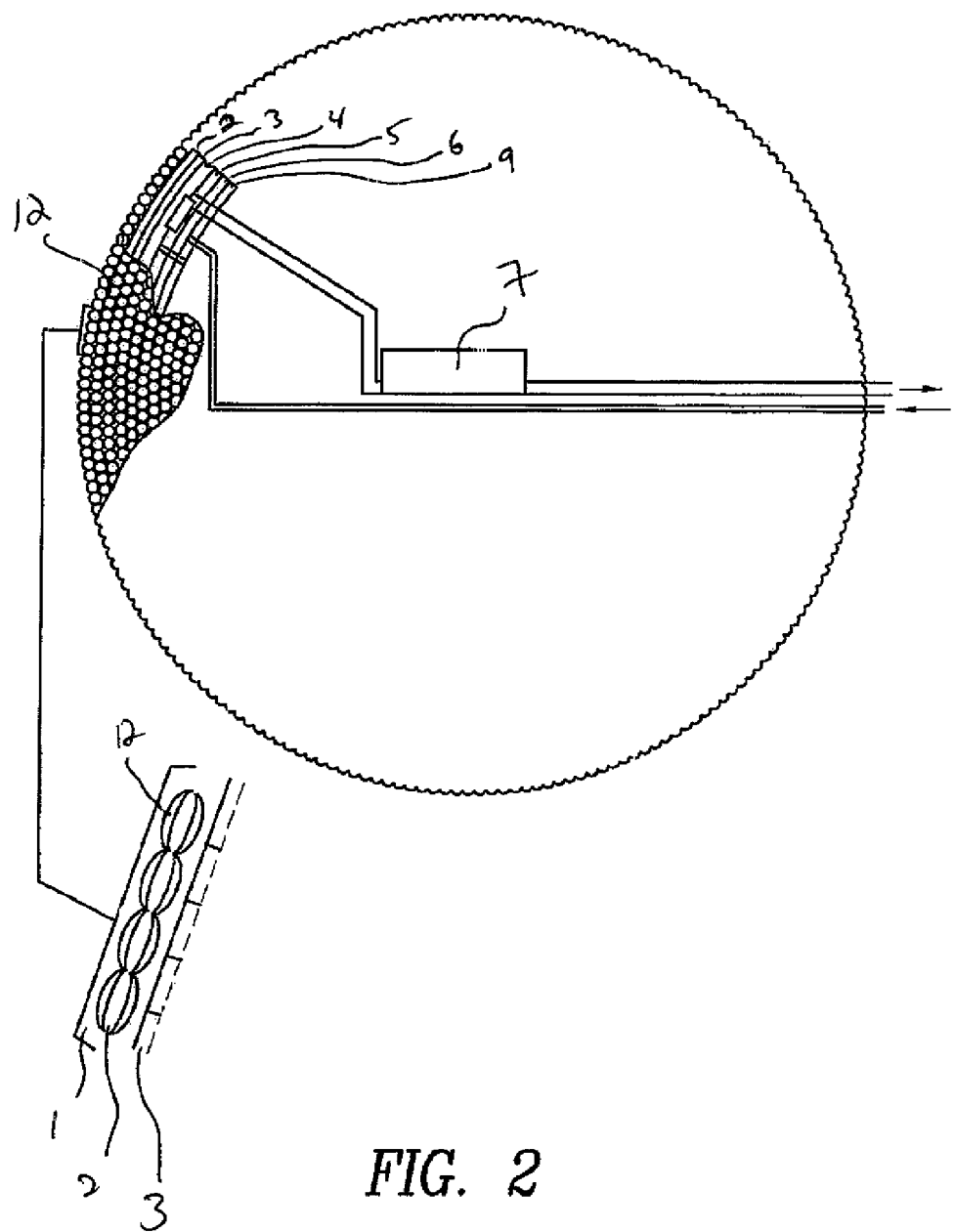
FIG. 2 is a schematic of a spherical or hemispherical array variation with wide angle coverage such as could be used on an extremely small MUAV or NUAV.

By spherizing the sensor array 4 in a 3-dimensional fashion (see FIG. 2) and by combining the information together by stitching, one obtains a full 360 degree "fish-eye" imaging capability in all 3-dimensions for wide angle view detection The image may be processed subsequently to produce either fisheye, rectilinear or other map projection formulae.

Figure 3:
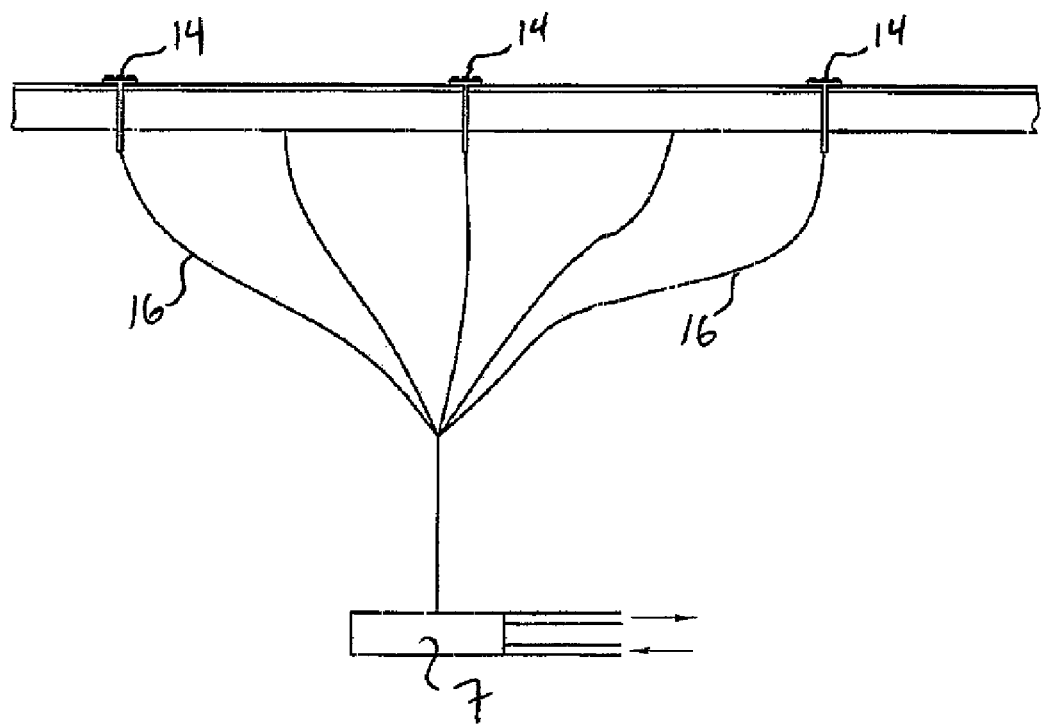
FIG. 3 is a schematic of a variation which separates individual lens pixel elements or groups of elements to produce a virtually invisible array functioning as a multiple telescope array (interferometrically) useful for mission critical surveillance.
Figure 4:
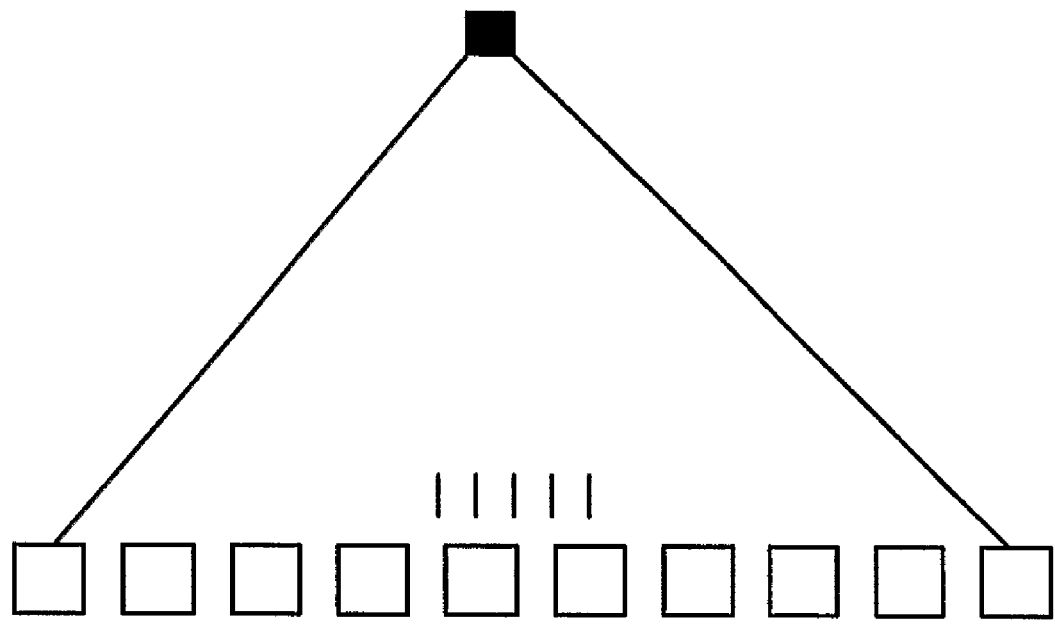
FIG. 4 describes the diffraction limit of the nano-lens. If the wavelength 560 is, for example, 560 nm (green), and the focal length is assumed to be 90 micrometers, then the lens diameter (assuming a constant of 1.22) is, governed by $$D = 1.22\, \lambda \Phi / \rho = 1.22 * 0.560 * 90 / 9 = 6.83 \text{ micrometers}.$$

Furthermore, multiple cameras 14 may be distributed in space and connected to each other (see FIG. 3) and or a central processor 7 by wire 16 or wirelessly it will be possible to enable retrieval of information from multiple sensors or sensor arrays 2 This information can be assembled interferometrically such as in a large radio telescope array or to create multiple viewpoints seeing around obstacles. It can also be employed as a tracking device enabling full 3-dimensional capability as well as a "measurement station" making true 3-dimensional metric determination of an unknown object.

As in most conventional optical systems, color imaging and spectroscopic imaging can be achieved by utilizing equal sized lenses and using multi-wavelength sensing layers below the lenses.

Furthermore spectroscopic imaging and/or spectroscopy can be achieved taking advantage of the unique optical properties of nano-scaled lenses by controlling the diameter of the lenses at a nanometer level thereby accepting various wavelengths below the diffraction limit as illustrated in, but not limited by, the two following examples:

A) In one configuration spectroscopy can be achieved in the following manner. Stepwise sized lenses with gradually increasing/decreasing diameter could be employed by utilizing processing algorithms to remove the longer wavelength cumulative component of the incrementally larger lenses, e.g. the smallest diameter lens being capable of admitting only the UV-light waves and the largest diameter lens admitting all wavelengths up to IR-radiation.

B) In another configuration color imaging can be achieved by controlling the diameter of a limited set of 2, 3 or more lenses at a nanometer level. Lenses with different diameters could be utilized to detect discrete wavelengths which subsequently are additively combined to produce a color-code necessary for standard color imaging (e.g. RGB, CMYK) or with similar processing as in example A, to produce spectroscopic imaging or false color processing.

REALIZATION OF THE INVENTION

The shape of optical elements may be realized using ordinary semiconductor processing methods such as different kinds of lithography processes, for instance but not limited to photolithography, UV-lithography, EUV-lithography, electron beam lithography, nanoimprint lithography, ion beam lithography, X-ray lithography as well as various kinds of embossing lithographies.

The radiation sensitive elements formed in the radiation sensitive layer may also be fabricated using standard semiconductor processing technology as discussed for the optical elements above.

The lenses as described above may in one embodiment be preferably realized by (but not limited to) using Nanoimprint lithography wherein a pre-patterned morphological stamp containing the inverse of the intended shape of the lenses is used to form a recessed structure in a polymer layer by mechanical indentation of the stamp into the polymer layer most often being melted above its glass transition temperature. The indentation into the resist is followed by a cooling cycle hardening the resist and then the stamp is removed. This NIL process can be applied both on flat and on curved substrates.

In one form this described radiation sensitive layer being formed into individual elements is a CCD-plate as found in many digital imaging devices. The invention is, however, not limited to employ such CCD-plates. As an alternative sensitive layer (but not limited to) one can use polymeric radiation sensitive detectors as known in the art of polymer electronics or radiation detectors being made in paper similar to the art known as paper electronics.

The invention claimed is:

1. A nano-imaging apparatus comprising multiple optical elements of sub-micron, nanometer scale, said optical elements functioning as lenses and have more than one pixel per optical element, said optical elements gathering overlapping information, said optical elements being supported onto a partly or fully radiation transmitting layer, which in turn is situated on top of a radiation sensitive layer being patterned so that under each of said optical elements there exists at least more than one radiation harvesting element that may be individually affected by radiation, whereby an image is obtained by combining said overlapping information.

2. The nano-imaging apparatus according to claim 1, wherein the material of the individual optical elements has a property that causes them to function as lenses.

3. The nano-imaging apparatus according to claim 2, wherein the partly or fully radiation transmitting layer comprises homogenous material or heterogeneous material, e.g. a layer consisting of fiber, spacer or a fluid or combinations thereof, being malleable by changing its volume, spacing, curvature, other shape change, or chemistry.

4. The nano-imaging apparatus according to claim 3, wherein the functions of focusing, light filtering, optical correction or zooming are achievable by at least one of fluidic, capillary force, molecular rearrangement, chemistry, or nano-sized levers or fibers to adjust size or refractive property of the optical system.

5. The nano-imaging apparatus in accordance with claim 4, wherein the optical elements further comprise different layers of refractive material enabling radiation of different wavelengths to be manipulated during the path through the optical element to compensate for aberration effects, and wherein the material and malleability of the individual optical elements and system are capable of focusing, zooming, light filtering and optical aberration correction.

6. The nano-imaging apparatus according to claim 2, wherein the radiation harvesting elements work as a photo-electric device that produces an electronic signal.

7. The nano-imaging apparatus according to claims 6, wherein the electronic signal produced can be monitored and/or manipulated by electronic digital processing making an electronic read-out possible.

8. The nano-imaging apparatus according to claim 7, wherein by image enhancing processing algorithms, overlapping information from physically (geometrically) or electronically defined arrays of sensors or "sectors" one can obtain a high resolution image.

9. The nano-imaging apparatus according to claim 8, wherein since each of the lenses has a slightly different spatial viewpoint, the multiple information from electronically or geometrically defined multiple sectors of the array of sensors can be processed to obtain 3-D or stereotypic images.

10. The nano-imaging apparatus according to claim 2, further comprising at least one shutter layer, wherein said apparatus is barely visible to ordinary vision or incorporated into either large, micro-sized or nano-sized devices.

11. The nano-imaging apparatus according to claim 1, wherein all elements of the imaging apparatus are made out of flexible materials.

12. The nano-imaging apparatus in accordance with claim 1, wherein the optical elements are arranged cylindrically as on a flexible tape, or spherically to obtain wide angle views.

13. The nano-imaging apparatus according to claim 1, further comprising a wide angle view detector having a sensor array curved in a 2-dimensional fashion combined with stitching the information together to thereby produce up to 360 degree panoramic imaging.

14. The nano-imaging apparatus according to claim 1, further comprising a wide angle view detector having a sensor array spherized in a 3dimensional fashion combined with stitching the information together thereby producing a full 360 degree imaging capability in all 3-dimensions in "fisheye", circular, rectilinear, or other fat map projections.

15. The nano-imaging apparatus according to claim 2, wherein color imaging and spectroscopic imaging are achieved by utilizing equal-sized lenses and using multi-wavelength sensing layers below the lenses.

16. The nano-imaging apparatus according to claim 2, wherein spectroscopic imaging and/or spectroscopy can be achieved by taking advantage of the optical properties of nano-scaled lenses by controlling the diameter of the lenses at a nanometer level thereby accepting various wavelengths below the diffraction limit.

17. The nano-imaging apparatus according to claim 16, wherein stepwise-sized lenses with gradually increasing/decreasing diameter are employed by utilizing processing to remove the cumulative component of the incrementally larger lenses.

18. The nano-imaging apparatus according to claim 17, wherein the smallest diameter lens is capable of admitting only the UV-light waves and the largest diameter lens admitting all wavelengths up to IR-radiation.

19. The nano-imaging apparatus according to claim 16, wherein color imaging can be achieved by controlling the diameter of a limited set of two or more lenses at a nanometer level.

20. The nano-imaging apparatus according to claim 19, wherein lenses with different diameters are utilized to detect discrete wavelengths which subsequently are additively combined to produce a color-code necessary for standard (e.g. RGB, CMYK) or false color processing.

21. The nano-imaging apparatus according to claim 7, wherein the electronic read-out signal is electronically processed in multiple ways, including by delivery to further imbedded processing and storage circuitry, or to deliver information to a separate or remote device, which in itself stores information for that can be observed, stored and/or redelivered/re-broadcast.

22. The nano-imaging apparatus according to claim 1, wherein multiple of said apparatuses are distributed in space and in communication with each other and/or a central processor enabling retrieval of multiple information, wherein said information can be assembled interferometrically or to create multiple viewpoints seeing around obstacles.

23. The nano-imaging apparatus according to claim 22, wherein said multiple of said apparatuses are employable as a tracking device enabling full 3-dimensional capability as well as a "measurement station" making true 3-dimensional metric determination of an unknown object.

* * * * *